(12) United States Patent
Van Doorselaer et al.

(10) Patent No.: US 9,749,883 B2
(45) Date of Patent: Aug. 29, 2017

(54) TROUBLESHOOTING WI-FI CONNECTIVITY BY MEASURING THE ROUND TRIP TIME OF PACKETS SENT WITH DIFFERENT MODULATION RATES

(75) Inventors: Karel Van Doorselaer, Edegem (BE); Koen Van Oost, Borsbeek (BE); Sylvain Dumet, Concord, NC (US); Dirk Van De Poel, Aartselaar (BE)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 13/984,914

(22) PCT Filed: Feb. 13, 2012

(86) PCT No.: PCT/EP2012/052380
§ 371 (c)(1),
(2), (4) Date: Aug. 12, 2013

(87) PCT Pub. No.: WO2012/110442
PCT Pub. Date: Aug. 23, 2012

(65) Prior Publication Data
US 2013/0322286 A1    Dec. 5, 2013

(30) Foreign Application Priority Data

Feb. 14, 2011  (EP) .................................... 11447002
Feb. 15, 2011  (EP) .................................... 11447003

(51) Int. Cl.
*H04W 24/06*    (2009.01)
*H04L 12/26*    (2006.01)
*H04W 84/12*    (2009.01)

(52) U.S. Cl.
CPC ......... *H04W 24/06* (2013.01); *H04L 43/0864* (2013.01); *H04L 43/10* (2013.01); *H04W 84/12* (2013.01)

(58) Field of Classification Search
CPC .... H04L 43/0864; H04L 43/10; H04W 24/06; H04W 84/12
See application file for complete search history.

(56) References Cited

U.S. PATENT DOCUMENTS 5,987,062 A    11/1999  Engwer et al.
7,295,960 B2   11/2007  Rappaport et al.
(Continued)

FOREIGN PATENT DOCUMENTS

CN    1713594    12/2005
CN    1287612    11/2006
(Continued)

OTHER PUBLICATIONS

P. Choi_Interference between IEEE802.11b and Bluetooth_Sep. 28, 2001.
(Continued)

*Primary Examiner* — Khaled Kassim
(74) *Attorney, Agent, or Firm* — Myers Wolin LLC

(57) ABSTRACT

The application relates to a "wireless communication network including a station and an access point" which is in particular a Wi-Fi network according to the IEEE 802.11 standards. Internet service providers are searching for ways to get a better understanding of the end-user's wireless environment including link quality and performance. The proposed method calculates a performance value based on measured round trip times which are sent at different modulation rates. Based the change of performance in dependence of the modulation rate conclusions about the possible source of performance problems can be drawn, in particular it can be distinguished between (Bluetooth) interference and distance between station and access point being too large.

18 Claims, 2 Drawing Sheets

(56) References Cited

U.S. PATENT DOCUMENTS

| | | | |
|---|---|---|---|
| 7,457,382 B1* | 11/2008 | Jones et al. | 375/347 |
| 7,506,052 B2* | 3/2009 | Qian et al. | 709/224 |
| 8,289,845 B1* | 10/2012 | Baldonado et al. | 370/230 |
| 2003/0037158 A1* | 2/2003 | Yano | H04L 29/06 709/232 |
| 2003/0148774 A1* | 8/2003 | Naghian | H04W 64/00 455/456.1 |
| 2003/0161341 A1 | 8/2003 | Wu et al. | |
| 2004/0064577 A1* | 4/2004 | Dahlin et al. | 709/235 |
| 2004/0066759 A1* | 4/2004 | Molteni et al. | 370/329 |
| 2005/0018611 A1* | 1/2005 | Chan et al. | 370/241 |
| 2005/0032494 A1 | 2/2005 | Swant | |
| 2005/0286416 A1* | 12/2005 | Shimonishi | H04L 1/1671 370/229 |
| 2005/0289395 A1 | 12/2005 | Katsuyama et al. | |
| 2006/0085541 A1* | 4/2006 | Cuomo et al. | 709/224 |
| 2006/0135066 A1 | 6/2006 | Banerjea | |
| 2006/0153089 A1* | 7/2006 | Silverman | 370/252 |
| 2007/0064669 A1* | 3/2007 | Classon | H04L 1/1822 370/347 |
| 2007/0197206 A1 | 8/2007 | Olson et al. | |
| 2008/0010367 A1* | 1/2008 | Chen et al. | 709/223 |
| 2008/0247327 A1* | 10/2008 | Weil et al. | 370/252 |
| 2009/0094361 A1* | 4/2009 | Srinivasan | 709/224 |
| 2010/0061399 A1* | 3/2010 | Li | H04N 21/2365 370/466 |
| 2010/0110921 A1 | 5/2010 | Famolari et al. | |
| 2010/0135178 A1* | 6/2010 | Aggarwal et al. | 370/252 |
| 2010/0172259 A1* | 7/2010 | Aggarwal et al. | 370/252 |
| 2010/0246416 A1 | 9/2010 | Sinha et al. | |
| 2011/0149759 A1 | 6/2011 | Jollota | |
| 2011/0179497 A1* | 7/2011 | Ayaki | H04L 9/3273 726/26 |
| 2011/0205943 A1* | 8/2011 | Grimm | H04L 1/0003 370/310 |
| 2011/0210887 A1* | 9/2011 | Eisen et al. | 342/357.25 |
| 2012/0231744 A1* | 9/2012 | Gregg et al. | 455/67.12 |
| 2013/0051332 A1* | 2/2013 | Sridhar | 370/329 |

FOREIGN PATENT DOCUMENTS

| | | |
|---|---|---|
| CN | 101330758 | 12/2008 |
| JP | 2008512025 | 4/2008 |
| JP | 2009194540 | 8/2009 |
| WO | WO9912228 | 3/1999 |
| WO | WO02065736 | 8/2002 |
| WO | WO2007100230 | 9/2007 |
| WO | WO2008125146 | 10/2008 |
| WO | WO2009022054 | 2/2009 |
| WO | WO2010037128 | 4/2010 |

OTHER PUBLICATIONS

D. Dujovne__A taxonomy of IEEE802.11 Wireless Parameters and Open Source Measurement Tools__Apr. 1, 2010; vol. 12, No. 2, pp. 249-262.

Search Report dated May 7, 2012.

Anonymous, "Supplement to IEEE Standard for Information Technology—Telecommunications and information exchange between systems—Local and Metropolitan area networks—Specific Requirements—Part 11: Wireless LAN Medium Access Control (MAC) and Physical Layer (PHY) specifications: Higher-Speed Physical Layer Extension in the 2.4 GHz Band", IEEE Std 802.11b-1999—(Supplement to ANSI/IEEE Std 802.11, 1999 Edition), Sep. 16, 1999, pp. 1-96.

Anonymous, "IEEE Standard for Information Technology—Telecommunications and information exchange between systems—Local and Metropolitan area networks—Specific Requirements—Part 11: Wireless LAN Medium Access Control (MAC) and Physical Layer (PHY) spécifications Amendment 2: Higher-speed Physical Layer (PHY) extension in the 2.4 GHz band—Corrigendum 1", IEEE Std 802.11b-1999/Cor Jan. 2001 (Corrigendum to IEEE Std 802.11b-1999), Nov. 7, 2001, pp. 1-24.

Anonymous, "IEEE Standard for Information Technology—Telecommunications and information exchange between systems—Local and Metropolitan area networks—Specific Requirements—Part 11: Wireless LAN Medium Access Control(MAC) and Physical Layer spécifications—Amendment 5: Enhancements for Higher Throughput", IEEE Std 802.11n-2009, Oct. 29, 2009, pp. 1-536.

Anonymous, "IEEE Standard for Information Technology—Telecommunications and information exchange between systems—Local and Metropolitan area networks—Specific Requirements—Part 11: Wireless Lan Medium Access Control(MAC) and Physical Layer (PHY) spécifications—Part 11: Wireless LAN Medium Access Control (MAC) and Physical Layer (PHY) spécifications—Amendment 4: Further Higher Data Rate Extension in the 2.4 GHz Band", IEEE Std 802.11g-2003, Jun. 12, 2003, pp. 1-77.

Anonymous, "Technical Report TR-069, CPE WAN Management Protocol v1.1", Broadband Forum, Issue 1, Amendment 2, Dec. 2007, pp. 1-138.

Anonymous, "Technical Report TR-098 Internet Gateway Device Data Model for TR-069", Issue 1, Amendment 2, Sep. 2008, pp. 1-239.

* cited by examiner

TROUBLESHOOTING WI-FI CONNECTIVITY BY MEASURING THE ROUND TRIP TIME OF PACKETS SENT WITH DIFFERENT MODULATION RATES

This application claims the benefit, under 35 U.S.C. §365 of International Application PCT/EP2012/052380, filed Feb. 13, 2012, which was published in accordance with PCT Article 21(2) on Aug. 23, 2012 in English and which claims the benefit of European patent application No. 11447002.4, filed Feb. 14, 2011 and European patent application No. 11447003.2, filed Feb. 15, 2011.

TECHNICAL FIELD

The present invention relates to a method for testing a wireless communications network including a station and an access point.

BACKGROUND OF THE INVENTION

Wireless transmission for local area networks (LAN) is in the meanwhile a well established technology for end users. An essential part of a local area network is a residential gateway connecting the local area network to the Internet. A mechanism for connecting wireless devices to the local area network is called Wi-Fi, which is a brand name of the Wi-Fi Alliance for devices using the IEEE 802.11 family of standards for wireless transmission. The IEEE 802.11 standards define a residential gateway as an access point and a wireless device connected to the access point is called a station. The Wi-Fi standards are defined such, that wireless devices distributed all over a home can be connected to the residential gateway without requiring any data cables. The IEEE 802.11b and 802.11g standards use the 2.4 GHZ ISM band, wherein the later developed 802.11g standard allows a data rate of up to 54 Mbit/s. A further improvement is the 802.11n standard, which can use both the 2.4 GHZ ISM band and the 5 GHZ U-NII band and which allows a theoretical data rate up of to 600 Mbit/s. A Wi-Fi network is often also called a WLAN (wireless local area network).

But the Wi-Fi technology has become victim of its own success: even though there are several non-overlapping frequency channels that can be chosen for data transmission (four in Europe, three in US), interference from neighbouring Wi-Fi devices has become a serious problem in urban areas. In addition, there are also other devices using the 2.4 GHZ ISM band, for example Bluetooth devices, microwave ovens, babyphones and others.

Therefore, in certain circumstances, the Wi-Fi connection can suffer from poor performance and even connection loss. Some of these circumstances are obvious and easy to explain to an end user. For example, if the distance between the station and the access point is too large, signal levels are low and performance will suffer. Some other of these circumstances are "invisible" and not understood by the end user, e.g. a metal grid in the ceiling or wall between a station and an access point, or interference from other Wi-Fi and non-Wi-Fi devices. In many cases, the end user is not able to diagnose the problem source and correct the issue. Even when the end user has the possibility to call a help desk, it is very difficult to diagnose Wi-Fi issues without having a specialist going on-site with special test equipment.

Troubleshooting Wi-Fi connectivity is a big challenge to operators and equipment vendors for a number of reasons:

Users don't fully understand the wireless technology and once associated, a user expects a "fixed line" stable link connectivity and bandwidth.

It is difficult to get accurate data about the time varying wireless link quality.

A large number of factors have impact on the wireless link quality, e.g. other access points, interference, hidden nodes, transmit power, receive sensitivity, which makes any partial information insufficient to diagnose problems. Therefore, information about only the access point or only the station are often insufficient.

The service provider or equipment vendor has little or no information about the building in which the Wi-Fi network is used, but the building topology is impacting the Wi-Fi network link performance.

In-home Wi-Fi network connectivity is correspondingly one of the main Internet service provider supports costs and causes for help-desk calls. Today's focus for operators is mainly on Wi-Fi network install, associating a station with an access point. Internet service providers are therefore searching for ways to get a better understanding of the end-user's wireless environment including link quality and performance. Related to Wi-Fi performance, operators can use a remote management protocol such as Broadband Forum TR-069 protocol, which provides access to Wi-Fi parameters as defined in the Internet Gateway Device data model BBF TR-098. But the information available via TR-069 is very limited, and when an end-user calls a help-desk it can be a lengthy and expensive process to describe the home topology and issues, e.g. my access point is in room X, the wireless printer is in room Y but when it is on, my wireless device Z has limited or no connectivity. Therefore, there is a high need for Wi-Fi diagnostics tools that collect information, interpret this, and suggest a solution to an end user.

US 2010/0110921 A1 describes a method to perform pre-evaluations of multiple Wi-Fi access points and access networks. A pre-evaluation determines whether or not an access point is connected to the Internet and measures the path performance that the access network can offer between the mobile device and a pre-specified Internet host. For determination of an Internet connectivity, a procedure is described using a ping message, e.g. an ICMP echo, to ping a testing party. An evaluation software stores the ping results, e.g. response times and number of successful responses, expressed as a percentage of attempts. For determining an end-to-end path performance of the access point, ICMP ping messages are used to record the throughput and delay characteristics between a users client device and the access point under test.

U.S. Pat. No. 7,295,960 discloses a method for determining optimal or preferred configuration settings for wireless or wired network devices in order to obtain a desirable level of network performance. A site-specific network model is used with adaptive processing to perform efficient design and on-going management of network performance. The method iteratively determines overall network performance and cost, and further iterates equipment settings, locations and orientations. Real time control is provided between a site-specific software application and physical components of the network to allow to display, store, and iteratively adapt any device to constantly varying traffic and interference conditions.

SUMMARY OF THE INVENTION

The method for testing a wireless communications network including a station and an access point comprises the steps of sending packets with different modulation rates from the station to the access point within a frequency band, waiting for confirmation and measuring the round trip time of each packet, and calculating a performance value by taking into account the measured round trip time of each packet and a reference round trip time of the packets.

In a preferred embodiment, the performance value is determined by calculating the ratio of the reference round trip time and the measured round trip time, and the round trip times of the packets are measured by sending the packets from the station to the access point and back. Alternatively, the station sends a packet to the access point and the access point sends an acknowledgement packet back to the station, and the respective round trip time is measured. The method uses advantageously a ping administration utility for sending of the packets and for measuring of the round trip times.

The modulation rate is varied in particular between a minimum modulation rate and a maximum modulation rate and the packet size is constant or is varied between a minimum packet size and a maximum packet size.

In an aspect of the invention, the method is automated for a user by using a numerical evaluation of the performance values, for example by using threshold values for associating a performance class to the performance values. A performance class can be for example "optimum performance", "range limitation", "interference problem", etc. By using respective threshold values, a multitude of performance classes can be defined for characterizing the performance of several locations of a home network of a user.

In a further aspect of the invention, the method is provided as a test application for a mobile wireless device, for analyzing a home network of a user. The mobile device is for example a smartphone, a tablet PC or a laptop, which is connected to a respective access point on initiation of the testing, after starting the application. During the test, the user takes the mobile device to different places in the house, for example to each room, or to different places in a particular room having coverage issues. The user initiates a multitude of tests at particular times and places, and the mobile device, or the station, logs as much information as possible for the mobile device.

BRIEF DESCRIPTION OF THE DRAWINGS

Preferred embodiments of the invention are explained in more detail below by way of example with reference to schematic drawings, which show.

DETAILED DESCRIPTION OF PREFERRED EMBODIMENTS

Figure 1:
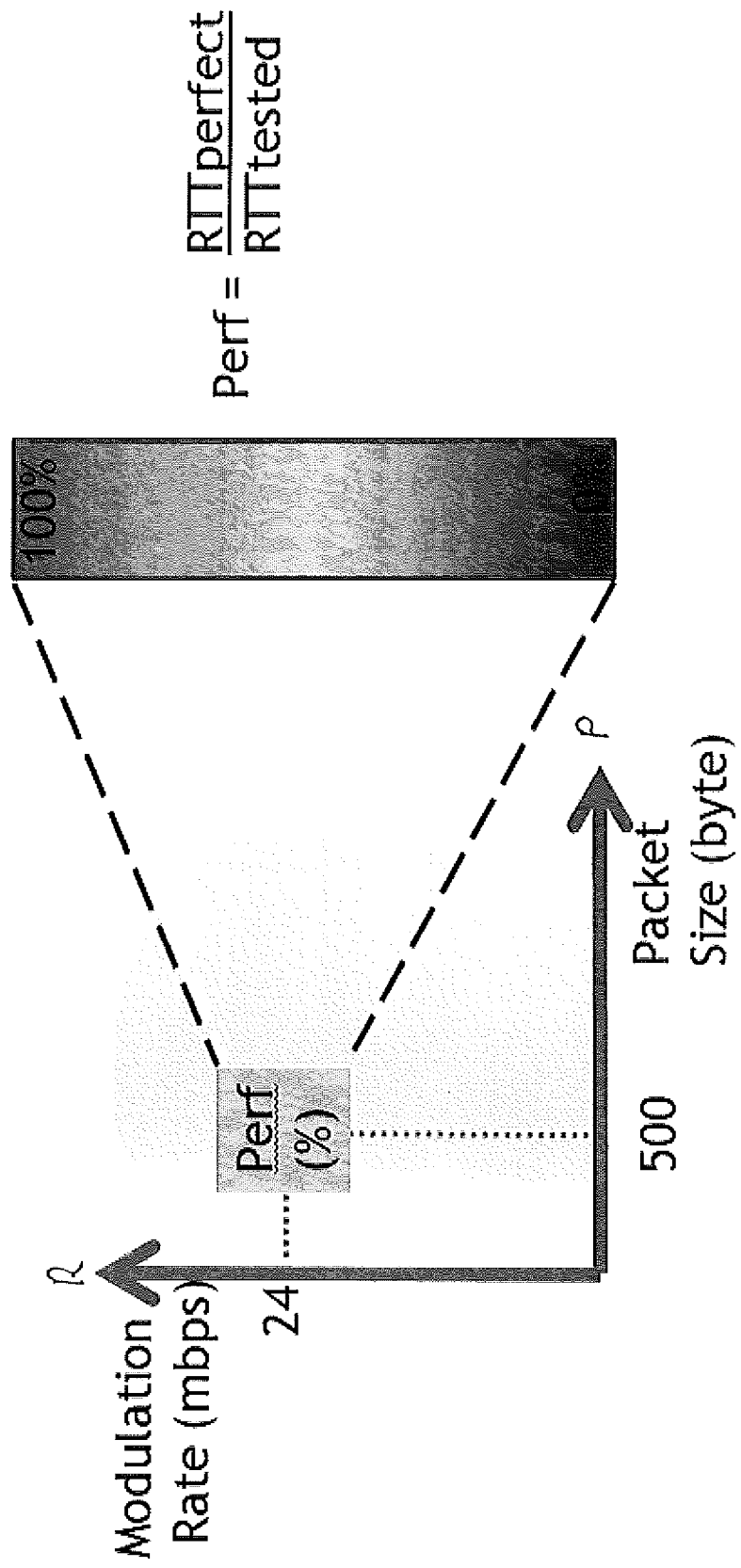
FIG. 1 performance values obtained with the test method, which are arranged as an IP-ping matrix for illustrating the performance of a Wi-Fi network, and FIG. 2 results for specific scenarios obtained with the test method in accordance with FIG. 1.

It is to be understood that the figures and descriptions of the present invention have been simplified to illustrate elements that are relevant for a clear understanding of the present invention, while eliminating, for purposes of clarity, other elements found in typical digital multimedia content delivery methods and systems. However, because such elements are well known in the art, a detailed discussion of such elements is not provided herein. The disclosure herein is directed to all such variations and modifications known to those skilled in the art.

The present invention manipulates the Wi-Fi configuration of a station for performing macro-level tests. In an aspect of the invention, the modulation rate set of the access point is reduced to a lower limit, for example 1 Mb/s, and this modulation rate is then varied across the range of the original modulation rate set, up to an upper limit. For each modulation rate, a macro-level test result is measured. With the macro-level tests, round trip times of packets are measured from a station to an access point and back. Advantageously, ping packets are used, for which then the ping round trip times are measured for a given packet size. These test results are then compared with results that would be obtained in the same test in ideal conditions, i.e. with a good signal-to-noise ratio (SNR), no interference, etc. In that way, a performance value in percent is obtained. But instead of ping packets, also any other throughput test may be used for measuring round trip times of packets of various sizes and by including different modulation rates.

For example, a ping with a packet size of 500 byte is used with a 1 Mb/s modulation rate in accordance with IEEE 802.11b, which may result in a round trip time of 10 ms in ideal conditions. If this test results in a specific test environment in a round trip time of 20 ms, two things can be concluded: The radio path between the station and the access point is good enough to transport 1 Mb/s modulated packets, i.e. the SNR ratios for both uplink and downlink are sufficient; and the real throughput with this modulation is only half of the ideal throughput. This can be the consequence of Wi-Fi interference, i.e. sharing the medium with another Wi-Fi network, or of non-Wi-Fi interference.

When using different modulation rates for a single packet size, i.e. 500 byte, for a given station at a given Wi-Fi channel, and interpreting the performance value, it is already possible to make conclusions about the possible source of performance problems. Specific examples: If the performance value is 100% for all modulation rates below 24 Mb/s and 0% for all modulations rates above this value, one can conclude that the transmission performance is limited by the SNR, i.e. due to the distance between station and access point or due to path loss. If the performance value is 50% for all modulation rates, it can be concluded that the radio path, from SNR point of view, is fine, but that there is interference on this channel. In that case, it makes sense to change the Wi-Fi setting to another channel to step away from this interference.

When combining the test results for a given station at a given channel with the test results at different channels and at different locations and/or for different stations, the diagnosis of the Wi-Fi network can be further refined. In the end, when a certain arrangement is finally selected, in which for example another Wi-Fi channel is selected or the access point is moved to another place, the described test method can be used again to evaluate the result of the change.

A preferred embodiment of the method is explained now in more detail with regard to FIG. 1, which depicts an IP-ping matrix for illustrating the performance of a Wi-Fi network including an access point and a station. The method uses ping packets having a size between a minimum size and a maximum size, e.g. between 1 byte and 2346 byte, which is the maximum size of the payload of a single Wi-Fi frame. The round trip time of each of the packets is measured by sending the packets from the station to the access point and back from the access point to the station. Alternatively, the station sends a packet to the access point and the access point sends an acknowledgement packet back to the station, and the respective round trip time is measured.

The modulation rate is modified between a minimum modulation rate and a maximum modulation rate, e.g. between 1 and 54 Mb/s, which is the maximum modulation rate according to the IEEE 802.11g standard. The modulation rate R is drawn up in FIG. 1 at the ordinate and the packet size P at the abscissa. For each data pair, packet size and modulation rate, a performance value in percent is calculated according to the formula RTTperfect/RTTtested, wherein RTTperfect is the ideal round trip time and RTTtested is the measured round trip time. The performance values are then drawn up as an IP ping matrix in accordance with the modulation rate R and the packet size P of each performance value. The ideal round trip time is used in this case in particular as a reference round trip time, which is the same for all locations within the home of a user. Alternatively, any other fixed round trip time may be used as the reference round trip time. Also, any other formula may be used for determining a performance value from the reference round trip time and the measured round trip time.

The ideal round trip time can be determined for example by placing the mobile wireless device close to the station, sending packets with a low modulation rate from the station to the access point, waiting for confirmation and measuring the round trip time of the packets. When sending ping packets of various packet sizes and various modulation rates and calculating the respective performance values, a detailed information is given about the performance of the tested Wi-Fi network.

Ping is a computer network administration utility used to test the reachability of a host on an Internet network and to measure the round trip time for messages sent from the originating host to a destination computer. Ping operates by sending Internet control message protocol (ICMP) echo request packets to the destination computer and waiting for an ICMP echo reply response. It measures the round trip time and records any packet loss.

Figure 2:
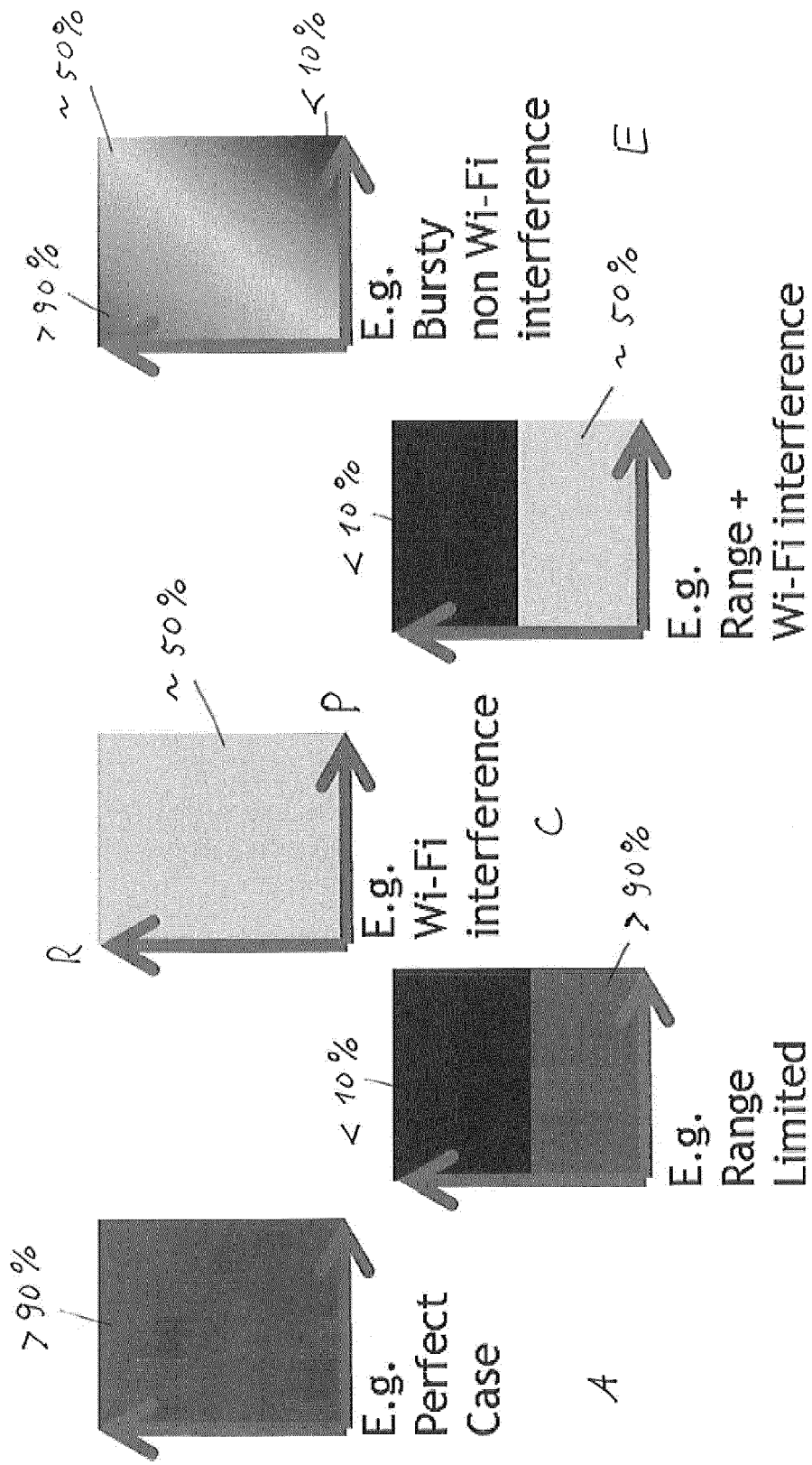

In FIG. 2 simplified results are shown for several situations, which can occur for a Wi-Fi network comprising an access point and a station. In FIG. 2A the result is shown for a Wi-Fi network having a high data throughput for all packet sizes and all modulation rates used during the test, e.g. >90% for modulation rates from 1 to 54 Mb/s and packet sizes from 1 to 2346 byte. This test result shows that the Wi-Fi network is working with optimum conditions.

In FIG. 2B, results are shown for a Wi-Fi network, which has an optimum performance rate for all packet sizes for lower modulation rates, e.g. >90% for modulation rates below 24 Mb/s. But for the higher modulation rates, the performance rate is very low, e.g. <10%. This is an indication that the distance between the station and the access point is at the limit of the coverage of the Wi-Fi network, because for the low modulation rates, which can be easier decoded by the access point than the higher modulation rates, all packet sizes can be recognized. But for the higher modulation rates, for which a better signal to noise ratio is necessary for decoding, packets of all sizes can be hardly decoded or even not be decoded. The test result of FIG. 2B indicates therefore clearly, that the tested Wi-Fi network has a range limitation, and therefore, no high data throughput can be obtained with this network.

In FIG. 2C, results are shown for a Wi-Fi network, for which the ping matrix provides performances values of about 50 percent for all packet sizes and all modulation rates. This is an indication for an interference signal of another Wi-Fi network, because a constant signal from a neighbouring Wi-Fi network in the same channel or in a neighbouring channel affects the data throughput for all packet sizes and all modulation rates.

In FIG. 2D results are shown for a Wi-Fi network, which yields for low modulation rates average performance values of about 50% for all packet sizes, but yields for high modulation rates very low performance values, e.g. <10%, for all packet sizes. This is an indication that the Wi-Fi network has interference problems, as discussed with regard to FIG. 2C, and in addition, the Wi-Fi network is range limited, as described for the Wi-Fi network with regard to FIG. 2B.

Finally, results are shown for a Wi-Fi network, FIG. 2E, which yields high performance values for large modulation rates and small packet sizes, e.g. >90%, and low performance values for large packet sizes and low modulation rates, wherein the performance value is about 50% in-between small packet sizes and low modulation rates and large packet sizes and high modulation rates. This is an indication for bursty interference signals, which in particular affect large packet sizes and therefore, the performance value for large packet sizes is the lowest. Otherwise, when using a higher modulation rate, the data throughput of the Wi-Fi network is increased, and therefore packets of a specific size are faster delivered from the station to the access point. Therefore, packets sent with the highest modulation rates are less affected by the bursty interference signals, which leads to the result that for a given packet size the performance value is the higher, the higher the modulation rate is.

As described with regard to FIG. 2, the method allows to analyze a large variety of different Wi-Fi network scenarios. In particular, scenarios, in which Wi-Fi or non-Wi-Fi interference is present, can be clearly distinguished from Wi-Fi networks having range problems. It can also be seen from FIG. 2, that when using a fixed packet size of e.g. 500 bytes or 1 kbyte and varying the modulation rate between 1 Mb/s and 54 Mb/s, for most situations already a clear indication about the problem of a Wi-Fi network can be given.

In a further aspect of the invention, the method is automated for a user by using a numerical evaluation of the performance values as obtained with the IP ping matrix, as described with regard to FIG. 1, for a specific location of the home network of the user. The method uses threshold values for defining a multitude of performance classes for the performance values in accordance with the IP ping matrix. A performance class can be for example "optimum performance", "range limitation", "interference problem", etc., as described with regard to FIG. 2. The performance class "optimum performance" is related for example to an IP pin matrix, which includes only performance values >90% for modulation rates between a minimum and a maximum value and packet sizes between a minimum and a maximum value, as described with regard to FIG. 2A. The performance class "range limitation" is related for example to an IP pin matrix, which includes performance values >90% for modulation rates below 24 Mb/s and performance values <10% for modulation rates above 24 Mb/s, as described with regard to FIG. 2B. The performance class "interference problem" is related for example to an IP pin matrix, which includes only performance values between 30% and 70% for all modulation rates between a minimum and a maximum value and packet sizes between a minimum and a maximum value, as described with regard to FIG. 2C. By defining respective threshold values, a multitude of performance classes can be assigned therefore to the IP ping matrix, for characterizing the performance of a home network of a user.

The automated method can be installed advantageously as a test application on a mobile station of a user, so that the user can easily analyze the quality of a Wi-Fi connection for any location within his home. The test application can indicate as a result for example whether any Wi-Fi interference is present or not, and propose respective measures to solve the problem.

The test application can be installed already on a new mobile station or may be provided from a service provider via Internet. The station is paired to the gateway on initiation of the testing, when starting the test application. When the test application has started, the user can take the mobile station to preferred locations in his house for testing. The user initiates tests at particular times and locations in his house, and the mobile station locks as much information as possible for each dedicated location. The test application provides a user therefore with detailed information about the performance of his Wi-Fi home network.

A user buys for example a wireless mobile device, e.g. a smartphone, a tablet PC or a laptop, on which the test application is already installed. The user associates the wireless mobile device as a station with his wireless access point in his home by using any of the existing Wi-Fi mechanisms, e.g. by configuring the wireless network WPA pre-shared key on the new device.

Alternatively, the test application is installed on his access point, and the user browses with his mobile device to the embedded graphical user interface of the access point to start the test application. If the user starts the test application, e.g. by clicking a link or button, a guide is presented on how to install the test application on his mobile device.

Once the test application is installed and running on the mobile device, the mobile device is ready for testing of the Wi-Fi home network. When the access point and the mobile device are synchronized, a user interface of the test application guides the user through the test procedure. The user is asked to take a position in the room, e.g. corner, and press an application "test" button. At this point in time, the application collects all information as necessary for the respective location, as described with regard to FIGS. 1 and 2, and logs this information together with the location information and time information. The location information is either a friendly name assigned by the user or possible GPS coordinates if the mobile device has a GPS receiver and current location information. The time information is used to relate the location information with the performance data after testing is completed.

In a further step, the user can select another room or another location to perform the test, again assigning a friendly name to that location, and performing a further test at that location. Once all tests are completed, the test application will display the test results for the user, including the following information: Date and time at which each test took place and locations at which the test took place, e.g. the actual geographical location information and/or a user assigned friendly name. These results include in particular the following: Areas in the house or apartment where the Wi-Fi coverage is ok and areas where no wireless devices can or should be; possible suggestions for alternative placement of the access point, if physically possible; places where a wireless repeater should be placed, if the user intends to use Wi-Fi devices at remote places; and interference data related to places in the house with suggestions to use another wireless channel or change to another frequency band, e.g. 5 GHz instead of 2.4 GHz.

The test results can be made available also to the Internet service provider and/or to the manufacturer of the access point via a remote management protocol, e.g. the Broadband Forum TR-069 protocol. This allows the Internet service provider to contact the user to place additional wireless repeaters in his home network or to upgrade certain equipment to latest Wi-Fi technologies for optimal performance.

The method has the advantage that more and more people have mobile wireless devices, like laptops, netbooks, smartphones and tablets at home, which can be used for testing without additional costs for the service provider or the user. By providing the method as a test application which can be easily installed on his mobile wireless device, the user can easily perform tests at different places in his home, for example by simply pressing a start button for the test application at the respective places. The test results are immediately available for the user after the test without any other intervention. These tests are performed alone by the user and are providing valuable information that is not available today to the user, also not to the Internet service provider. No expensive testing equipment is required.

The method therefore does not require any assumptions on the specific behavior of the station, except the behavior as defined by IEEE 802.11 standards and the Wi-Fi Alliance guidelines. These specifications leave a lot of freedom with regard to the algorithms that are used to optimize the Wi-Fi performance in specific conditions of a wireless home network. The most important algorithms are in particular the retransmission behavior and the rate adaptation algorithm: The retransmission behavior requires that a data frame from A to B that is received well is acknowledged by an "ack-frame". In case no "ack-frame" is received, a certain number of retransmissions are attempted, possibly by using a more robust modulation. The rate adaptation algorithm requires that each Wi-Fi node is continuously trying to find the best trade-off with regard to which modulation rate to use when sending data frames. Faster modulation rates require a better signal to noise ratio at the receiver side, but occupy the Wi-Fi medium for a shorter time, given the same frame size. This trade-off can be based on a lot of different parameters, such as the number of retransmissions, RX signal strength, etc. Also several other algorithms, such as RTS/CTS behavior, fragmenting wireless frames in several shorter frames etc., will influence the detailed behavior of a specific Wi-Fi implementation of the wireless home network.

The above-described freedom in detailed behavior, in combination with the boundary conditions that no assumption can be made with regard to the availability of analysis information from a station results in the quasi-impossibility to perform a "micro-level" analysis on the access point side, for example check for number of retransmissions to and from a certain station when at a certain modulation, etc., and interpret these in such a way that they can be translated into something meaningful for the user. On the other side, a macro-level test, i.e. an analysis at the level of data transport over the wireless link, such as throughput or packet loss at the IP layer, will accurately reflect the user perception of the wireless performance, but will give very little to no insight as to what is causing performance issues.

Correspondingly, the method as described with regard to FIG. 1 does not make any assumptions on the behavior and availability of analysis information of a station as used for testing; the method is based on macro-level tests, by sending packets with different modulation rates from the station to the access point within a frequency band, waiting for confirmation and measuring the round trip time, and calculating a performance value by taking into account the measured round trip time for each packet and a reference round trip time. The final result correlates directly to the user's view of wireless performance. Because of that, any source of Wi-Fi deterioration can be detected, which is not the case for micro-level tests.

Also other embodiments of the invention may be utilized by one skilled in the art without departing from the scope of the present invention. The wireless communications network is in particular a network in accordance with one of the IEEE 802.11 standards and the frequency band is a 2.4 GHz ISM band or a 5 GHz U-NII band, but also any other wireless communications networks using any other frequency band can be tested with the method. The invention resides therefore in the claims herein after appended.

The invention claimed is:

1. A method for testing a wireless communications network including a station and an access point, the method comprising:
   sending, by the station, packets with different modulation rates from the station to the access point within a frequency band, by varying the modulation rate between a minimum modulation rate and a maximum modulation rate;
   sending, by the station, packets with different packet sizes from the station to the access point, by varying the packet size between a minimum packet size and a maximum packet size;
   measuring, by the station, a round trip time for each packet; and
   calculating, by the station, a performance value by determining a ratio of a reference round trip time and the measured round trip time of each packet.

2. The method of claim 1, wherein the wireless communications network is in accordance with an IEEE 802.11 standard.

3. The method of claim 1, further comprising using, by the station, a ping administration utility for sending of the packets.

4. The method of claim 1, wherein the frequency band is a 2.4 GHz ISM band or a 5 GHz U-NII band.

5. The method of claim 1, wherein the minimum modulation rate is 1 Mb/s and the maximum modulation rate is 54 Mb/s.

6. The method of claim 1, wherein the minimum packet size is 1 byte and the maximum packet size is a maximum size of a payload of a single Wi-Fi frame.

7. The method of claim 1, further comprising:
   receiving, by the station, an acknowledgement packet back from the access point; and
   measuring, by the station, a respective round trip time.

8. The method of claim 1, further comprising using, by the station, a numerical evaluation of the performance values.

9. The method of claim 8, further comprising:
   using, by the station, threshold values for defining a multitude of performance classes for performance values; and
   classifying, by the station, the obtained performance values of a particular location of a home network with one of the performance classes.

10. A mobile device comprising:
    a memory;
    at least one processor configured to:
    send, over a wireless communication network, packets with different modulation rates to an access point within a frequency band, by varying the modulation rate between a minimum modulation rate and a maximum modulation rate;
    send packets with different packet sizes to the access point, by varying the packet size between a minimum packet size and a maximum packet size;
    measure a round trip time for each packet; and
    calculate a performance value by determining a ratio of a reference round trip time and the measured round trip time of each packet and a reference round trip time of the packets.

11. The mobile device of claim 10, wherein the wireless communications network is in accordance with an IEEE 802.11 standard.

12. The mobile device of claim 10, wherein the at least one processor is further configured to use a ping administration utility for sending of the packets.

13. The mobile device of claim 10, wherein the frequency band is a 2.4 GHz ISM band or a 5 GHz U-NII band.

14. The mobile device of claim 10, wherein the minimum modulation rate is 1 Mb/s and the maximum modulation rate is 54 Mb/s.

15. The mobile device of claim 10, wherein the minimum packet size is 1 byte and the maximum packet size is a maximum size of a payload of a single Wi-Fi frame.

16. The mobile device of claim 10, wherein the at least one processor is further configured to:
    receive an acknowledgement packet back from the access point; and
    measure a respective round trip time.

17. The mobile device of claim 10, wherein the at least one processor is further configured to use a numerical evaluation of the performance values.

18. The mobile device of claim 10, wherein the at least one processor is further configured to:
    use threshold values for defining a multitude of performance classes for performance values; and
    classify the obtained performance values of a particular location of a home network with one of the performance classes.

* * * * *